United States Patent [19]
Okuzaki et al.

[11] Patent Number: 5,712,024
[45] Date of Patent: Jan. 27, 1998

[54] ANTI-REFLECTOR FILM, AND A DISPLAY PROVIDED WITH THE SAME

[75] Inventors: Sachiko Okuzaki; Tomoji Oishi; Takao Ishikawa; Daigoro Kamoto, all of Hitachi; Ken Takahashi, Tokai-mura; Masahiro Nishizawa; Norikazu Uchiyama, both of Mobara, all of Japan

[73] Assignee: Hitachi, Ltd., Tokyo, Japan

[21] Appl. No.: 611,859

[22] Filed: Mar. 6, 1996

[30] Foreign Application Priority Data

Mar. 17, 1995 [JP] Japan ................... 7-059099

[51] Int. Cl.$^6$ ................... B32B 3/00
[52] U.S. Cl. ................ 428/195; 428/143; 428/204; 428/206; 428/207; 428/212; 428/411.1; 428/688; 428/690; 428/913
[58] Field of Search ................ 428/411.1, 207, 428/209, 212, 123, 334, 925, 913, 143, 195, 204, 206, 688, 690

[56] References Cited

U.S. PATENT DOCUMENTS 5,251,202  10/1993  Kaneko et al. .................. 369/286
5,473,396  12/1995  Okajima et al. ................. 353/122
5,514,526   5/1996  Nishi et al. .................... 430/325

Primary Examiner—William Krynski
Attorney, Agent, or Firm—Antonelli, Terry, Stout, & Kraus, LLP

[57] ABSTRACT

An anti-reflection film is in the form of a laminated film composed of an uppermost film layer containing coloring matter having an absorbing peak in a region near the infrared region of 700 nm–900 nm, or coloring matter having an absorbing peak in a region of 600 nm–700 nm, or both of the above coloring matter, and the next film layer to the uppermost layer containing coloring matter having an absorbing peak in a region of 500 nm–600 nm. The anti-reflection film utilizes a variation of the refractive indexes based on abnormal refractive index dispersion by the films containing the coloring matter. The anti-reflection film having a low reflectivity all over the visible light region can be manufactured by utilizing the abnormal refractive index dispersion of the next layer to the uppermost layer caused by an absorption of red coloring matter and a balance with the refractive indexes of the uppermost layer containing red color matter having an absorption in the region near the infrared wavelength, or blue coloring matter, or both of the above coloring matter. Furthermore, red coloring matter, having an absorbing peak in the region of 500 nm–600 nm and contained in the next layer to the uppermost layer, absorbs side bands of green and red, and accordingly, color purity is improved.

29 Claims, 10 Drawing Sheets

ANTI-REFLECTOR FILM, AND A DISPLAY PROVIDED WITH THE SAME

BACKGROUND OF THE INVENTION

The present invention relates to a surface treating film, especially to an anti-reflection film or an anti-reflection/anti-static film provided at the front surface of a face plate of a display apparatus, such as a cathode ray tube.

Currently, for improving the performance of a display apparatus such as a cathode ray tube, the cathode ray tubes have been provided with an anti-reflection film, which is an optical thin film consisting of a monolayer or of laminated multi-layers formed at the front surface of the face plate of the cathode ray tube in order to prevent incident light reflection due to the interference effect of light. As for the anti-reflection film, a film generally called a ¼ wavelength film has been used. The ¼ wavelength film utilizes a monolayer film which satisfies the following conditions (1) and (2), where $n_0$ is the refractive index of air, $n_1$ and d are respectively the refractive index and film thickness of the anti-reflection film, $n_2$ is the refractive index of the substrate, and $\lambda$ is the wavelength of the light which is to be prevented from being reflected.

$$n_1 d = \lambda/4 \quad (1)$$

$$n_1^2 = n_0 n_2 \quad (2)$$

When glass is used as the substrate, $n_2$ is 1.52, and $n_0$ is 1.0, i.e. the refractive index of air. Therefore, the refractive index $n_1$ of the anti-reflection film must be 1.23. However, because no material having a refractive index of 1.23 is known, no monolayer film having a sufficient anti-reflection effect has been manufactured.

Therefore, a laminated anti-reflection film, wherein two layers composed of an upper layer film 3 and a lower layer film 4 are laminated on a substrate 5, as shown schematically in the cross sectional view of FIG. 2, has been generally used. When external light 10 is projected into the laminated anti-reflection film, reflected light 11 is generated at the boundary between the air and the upper layer film 3, reflected light 12 is generated at the boundary between the upper layer film 3 and the lower layer film 4, and reflected light 13 is generated at the boundary between the lower layer film 4 and the substrate 5, respectively. Actual reflected light 14 is the light synthesized by all of the reflected light 11, 12, 13. As for the laminated reflection film, a two-layer film which satisfies the following conditions (3), (4), and (5) may be provided, where $n_0$ is the refractive index of air, $n_2$ is a refractive index of the substrate 5, $n_3$ and $d_3$ are respectively the refractive index and film thickness of the upper layer film 3 of the laminated anti-reflection film, $n_4$ and $d_4$ are respectively the refractive index and film thickness of the lower layer film 4 of the laminated anti-reflection film, and $\lambda$ is the wavelength of the light which is to be prevented from being reflected.

$$n_3 d_3 = \lambda/4 \quad (3)$$

$$n_4 d_4 = \lambda/4 \quad (4)$$

$$n_2 n_3^2 = n_0 n_4^2 \quad (5)$$

When a glass substrate is used, $n_2$ is 1.52, and $n_0$ is 1.0, i.e. the refractive index of air. Therefore, a combination of the films having a high refractive index/a low refractive index must be selected so that a ratio of the refractive indexes of the upper and the lower anti-reflection films come to be 1.23. Furthermore, as the film thickness is determined by the wavelength which is to be prevented from being reflected, the reflection of N wavelengths can be decreased by forming N layers of the anti-reflection film.

Furthermore, a cathode ray tube for high resolution TV, wherein a selective light absorption film (a light filtering layer) is formed at the front surface of the face plate, has been manufactured. The light filtering layer is used for preventing reflection by absorbing light of a specified wavelength selectively by filtering, and for improving contrast and color purity by absorbing side bands of a fluorescent emission spectrum, which is a cause of color purity deterioration. Generally, as for the filter, an organic coloring matter-glass gel hybrid film prepared by a sol-gel method is used, as disclosed in JP-A-1-320742 (1989). The filter is formed by heat-treatment of a sol solution, wherein various organic coloring matter are mixed after applying the sol solution to the face plate.

JP-A-4-218247 (1992) discloses a filter, wherein fine particles of conductive material, such as tin oxide, are contained in a layer for providing an anti-static charge effect, and a filter, wherein layers are laminated for providing both anti-reflection and anti-static effects.

JP-A-6-208003 (1994) discloses a method for decreasing reflection by providing at least one layer of a plurality of laminated layers with a coloring matter having absorption in the entire visible light region of 400–700 nm so as to increase the refractive index in all of the visible light region. Further, in order to improve the contrast, a method is adopted wherein a pigment having reflective spectrum similar to a phosphor emission spectrum is applied to the phosphor. In accordance with this method, the emission of the phosphor is hardly absorbed, external light is decreased by absorption of light other than in the reflective region, and consequently the contrast is improved. The above described method is used practically for phosphors of blue or red.

As described above, a laminated multi-layer film having a low refractive index/a high refractive index combination, or an anti-reflection film utilizing an interference effect of light by forming the multi-layer film on a substrate are well known. If a difference in the refractive index between the upper layer and the lower layer is small, a relatively flat spectral reflectivity curve can be obtained, but the reflection at a bottom wavelength can not be decreased sufficiently. On the contrary, if the difference in the refractive index between the upper layer and the lower layer is large, the reflection at the bottom wavelength can be decreased sufficiently. However, since the spectral reflectivity curve rises rapidly as the wavelength rises from the bottom wavelength, a problem of screen glaring occurs.

Currently, with a view toward improving the anti-static effect, a low resistant film is frequently used as the lower layer film. However, as the low resistant film generally has a high refractive index, the difference in refractive index between the upper layer film and the lower layer film becomes large, and the screen glaring becomes a serious problem. When either layer of the laminated multi-layer anti-reflection film is doped with a coloring matter, an abnormal change in the reflectivity of the film at a specified region becomes a problem. In preparing the film containing the coloring matter, organic dyes, such as azo-dye and anthraquinone dye, which are extremely soluble in a solvent, such as water and alcohol, are used. Therefore, a problem is generated in that the organic dye is blurred out when the surface of the cathode ray tube is wiped with a loth containing water, or alcohol after preparing the film.

An organic coloring matter containing film having both an anti-reflection effect and an anti-static effect is composed of a laminated film which is prepared by the steps of applying a sol solution of silicon dioxide containing conductive fine particles, such as tin oxide and the organic coloring matter, onto the screen surface of the cathode ray tube, forming a film, applying a sol solution containing only silicon dioxide onto the formed film, and forming a film. Since the sol solution containing only silicon dioxide has a large amount of alcohol and water as solvents, the organic coloring matter in the lower layer oozes out into the upper layer, and causes a problem in that it tends to generate an abnormal reflectivity by abnormal dispersion of the refractive index. The method disclosed in JP-A-6-208003 (1994) has a problem in that, as the refractive index increases all over the visible light region, the difference in the refractive index between the upper layer and the lower layer becomes significant, and the reflectivities of the film in the vicinity of wavelengths of 400 nm and 700 nm become extraordinarily high in comparison with the refractive index in the vicinity of the bottom wavelength, i.e. 560 nm.

SUMMARY OF THE INVENTION

One of the objects of the present invention is to provide an anti-reflection film which solves the above problems of the prior art, and has an anti-reflection effect in a wide wavelength region.

Another one of the objects of the present invention is to provide a display apparatus using a anti-reflection film having a high contrast, an anti-static effect, and an anti-reflection effect.

In accordance with the present invention, a laminated multi-layer anti-reflection film realizing a preferable anti-reflection effect in a wide wavelength region can be obtained by utilizing in a positive way the refractive index dispersion of the film.

The anti-reflection film of the present invention comprises a laminated structure composed by laminating two thin layers, and is characterized by the fact that the two thin layers have a refractive index dispersion such that the difference in refractive index is large in a longer wavelength region than at a central wavelength of a wavelength region wherein the reflection must be avoided, and is small in a shorter wavelength region. For instance, in order to obtain an anti-reflection film which is able to suppress reflection all over the visible light region, two layers having a large difference in refractive index in the vicinity of 560 nm and a small difference in refractive index in the vicinity of 400 nm must be laminated.

Further, the anti-reflection film of the present invention comprises a laminated structure composed by laminating two thin layers, and is characterized by the fact that the two thin layers have a refractive index dispersion such that the refractive index is high in a longer wavelength region than at a central wavelength of a wavelength region wherein the reflection must be avoided, and is low in a shorter wavelength region.

Furthermore, the anti-reflection film of the present invention comprises a laminated structure composed by laminating two thin layers, and is characterized by the fact that the two thin layers have a refractive index dispersion such that the length of the light passage at respective wavelengths in the wavelength region wherein the reflection must be avoided is approximately ¼ of the wavelength in said region, and a ratio of the refractive index at the respective wavelengths is approximately constant.

The film having the desired refractive index dispersion can be obtained by utilizing the abnormal dispersion in the refractive index of the material having an absorption, that is, a coloring matter having absorption peak in the desired wavelength region must be contained in the film.

As an example, the anti-reflection film of the present invention comprises a laminated multi-layer structure wherein at least two thin layers are laminated, and is characterized by the fact that the uppermost layer and the layer next beneath the uppermost layer contain respectively different kinds of coloring matter. The refractive index of the uppermost layer is set so as to be smaller than the refractive index of the next beneath the uppermost layer. The coloring matter contained in the uppermost layer is preferably a coloring matter having an absorption capability at the near-infrared region of 700–900 nm, or a coloring matter having an absorption peak in a region of 600–700 nm, or both coloring matter. The coloring matter contained in the layer next beneath the uppermost layer is preferably a coloring matter having an absorption peak in a region of 500–600 nm.

At least one layer of the multi-layer film is desirably conductive, and the conductive layer is preferably the layer having a high refractive index next beneath the uppermost layer.

As examples of specific structures of the anti-reflection film, various anti-reflection films can be employed, as follows:

(1) an anti-reflection film wherein the layer next beneath the uppermost layer is conductive, and contains a material having an absorption peak in a region of 500–600 nm;

(2) an anti-reflection film wherein the uppermost layer contains a material having an absorption peak in the near-infrared region of 700–900 nm, or a material having an absorption peak in a region of 600–700 nm, or both of the materials, and the layer next beneath the uppermost film is conductive;

(3) an anti-reflection film wherein the uppermost layer contains a material having an absorption peak in the near-infrared region of 700–900 nm, or a material having an absorption peak in a region of 600–700 nm, or both of the materials, and the layer next beneath the uppermost layer contains a material having an absorption peak in a region of 500–600 nm; and (4) an anti-reflection film wherein the uppermost layer contains a material having an absorption peak in the near-infrared region of 700–900 nm, or a material having an absorption peak in a region of 600–700 nm, or both of the materials, and the layer next beneath the uppermost layer contains a material having an absorption peak in a region of 500–600 nm, and is conductive.

Furthermore, the anti-reflection film of the present invention comprises a laminated structure formed by laminating at least two thin layers, and is characterized by the fact that the layers of odd number order counted from the uppermost layer contain a material having an absorption peak in a region of 300–400 nm.

In any of the above described anti-reflection films, the layer next beneath the uppermost layer can contain $SnO_2$ ZnO, or ITO.

The film made up of respective layers is preferably prepared by forming a layer by applying a solution containing a solvent, wherein the coloring matter contained in the adjacent layer is not soluble or not dispersible, as a main component.

As for materials having an absorption peak in the near-infrared region of 700–900 nm, naphthalocyanine group coloring matter, such as brilliant cresyl blue, silicon naphthalocyanine, and the like, anthraquinone group coloring matter, and polymethyne group coloring matter can be used. As for materials having an absorption peak in the region of 600–700 nm, phthalocyanine group coloring matter, such as copper phthalocyanine and the like, and phenoxazine group coloring matter, such as methylene green and the like, can be used. As for materials having an absorption peak in the region of 500–600 nm, azo group coloring matter, such as acid red, anthraquinone group coloring matter, such as alizarine red S and the like, triphenylmethane group coloring matter, such as crystal violet and the like, xanthene group coloring matter, such as rhodamine B and the like, can be used. As for materials having an absorption peak in the region of 300–400 nm, phthalocyanine group coloring matter, such as copper phthalocyanine and the like, and benzophenone group coloring matter and the like can be used.

As for the coloring matter, various types of dyes and pigments can be used. However, when using a pigment, the particle size of the dispersed pigment preferably should be equal to or less than 100 nm. For instance, a pigment similar to acid red is a quinacridone group pigment. Phthalocyanine and naphthalocyanine group pigments may be used as pigments, and additionally they may be substituted with various compounds for increasing solubility. As for infrared absorbing agents, anthraquinone group compounds and polymethyne group compounds can be used.

By forming the above anti-reflection film at the surface of a screen of a display apparatus, such as cathode ray tube, a high resolution display apparatus can be obtained.

It is well known that a material such as a coloring matter which has absorption in a specified wavelength region disperses abnormally in refractive index at its absorption region. The above behavior is theoretically predictable in accordance with the following equation (6) which indicates the refractive index of the material which has absorption:

$$n(v_i) = n_\infty + 2/\Pi \int_{}^{v_b} va\{vk/(v^2 - v_i^2)\}dv \quad (6)$$

$$k = \alpha/4\Pi v$$

Where,

1 $n(v_i)$: a refractive index at wave number $v_i$ $n_\infty$: a refractive index in a region where no absorption exists (approximately a refractive index of a film which does not contain any coloring matter)

$\alpha$: absorbance

In accordance with the above equation (6), it is revealed that the refractive index varies depending on the amount of absorption because the value of k is not zero for a film which has absorption. Therefore, when either one of the laminated films of low refractive index/high refractive index is doped with a coloring matter, the reflectivity of the doped film changes abnormally in the absorption wavelength region of the coloring matter in comparison with the reflectivity of a not doped laminated film. This phenomenon is a substantial problem, but, on the other hand, a possibility is suggested for forming a film having a low reflectivity all over the visible light region if the abnormal dispersion of the refractive index is utilized. That is, the present invention is based on the consideration that a film having a low reflectivity over a wide wavelength region can be formed by the following steps.

When a two-layer anti-reflection film is formed on a glass substrate, as illustrated in FIG. 2, the reflection becomes zero at a wavelength, $\lambda_0$, which satisfies the following conditions based on the previous equations (3)–(5):

$$n_4/n_3 = 1.23$$
$$n_3 d_3 = \lambda_0/4$$
$$n_4 d_4 = \lambda_0/4$$

And, the reflection increases as the incident wavelength becomes more distant from $\lambda_0$. Therefore, the reflectivity forms a V shaped curve, of which the bottom is at the wavelength, $\lambda_0$. In this condition, the amplitude of the reflected light 11 at the boundary of the air and the upper layer film 3 is expressed by $(n_0-n_3)/(n_0+n_3)$, the amplitude of the reflected light 12 at the boundary of the upper layer film 3 and the lower layer film 4 is expressed by $(n_3-n_4)/(n_3+n_4)$, and the amplitude of the reflected light 13 at the boundary of the lower layer film 4 and the substrate 5 is expressed by $(n_4-n_2)/(n_4+n_2)$, respectively. Further, the phase of the reflected light 12 at the boundary of the upper layer film 3 and the lower layer film 4 is expressed by $4\Pi n_3 d_3/\lambda$, and the phase of the reflected light 13 at the boundary of the lower layer film 4 and the substrate 5 is expressed by $4\Pi n_4 d_4/\lambda$. Accordingly, if the wavelength changes, the phase of the reflected light is changed. And, depending on the wavelength, the phases of reflected light from respective boundaries coincide and, as a result, the reflection is enhanced. In order to prevent such a phase shift, the refractive index of the thin films must vary corresponding to the wavelength. Generally speaking, the phase shift becomes small when the difference between $N_3$ and $N_4$ is small in a region of the wavelength shorter than the wavelength $\lambda_0$ in which the reflection must be mainly suppressed. On the contrary, in a region where the wavelength is longer than the wavelength $\lambda_0$ in which the reflection must be mainly suppressed, the phase shift becomes small when the difference between $N_3$ and $N_4$ is large. However, as a change of the refractive index influences not only the phase but also the amplitude, the refractive index must be set cautiously.

In case of an advanced step, the necessary condition for setting the refractive index so as to make the reflection zero over all wavelengths, in a region in which reflection must be prevented, is considered such that all the non-reflection conditions expressed by the equations (3)–(5) must be satisfied with for every wavelength in the region. The above necessary conditions can be satisfied if a film can be obtained whose refractive index varies continuously in accordance with changes of the wavelength, as shown in FIG. 3. In order to obtain the refractive index dispersion as shown in FIG. 3 by controlling the refractive index by utilizing the absorption by the color as previously explained, mixing a coloring matter having an absorption capability for all the visible light into the film can be utilized. However, the same effect can be achieved by blending various kinds of coloring matter having mutually different absorption peaks with an adequate concentration to form a mixture and mixing the mixture into the film.

Next, a simple model of a laminated anti-reflection film for the visible wavelength region will be explained while referring to FIG. 2. The model is taken as a film having two thin layers forming a laminated structure (a low refractive index film/a high refractive index film), wherein the upper layer film and the lower layer film contain respectively different kinds of coloring matter having different absorption peaks. In FIG. 2, the reference numeral 3 indicates the upper low refractive index film, 4 indicates the lower high refractive index film, and 5 indicates a substrate. The upper layer film 3 has a refractive index of 1.46 without any coloring matter, and contains coloring matter having an absorption peak in the near infrared region of 700–900 nm and other coloring matter having an absorption peak in the region of 600–700 nm. Coloring matter contained in the lower layer film 4 is red coloring matter having an absorption peak in the region of 500–600 nm. The lower layer film 4 has a refractive index of 1.8 without any coloring matter. When the upper layer of the laminated film has an absorption as shown in FIG. 6(a) due to the coloring matter therein, the refractive index of the upper layer film has an abnormal dispersion such that the refractive index becomes large in the longer wavelength region than the respective absorption peaks and small in the shorter wavelength region than the respective absorption peaks, as shown in FIG. 6(b), based on an absorbing effect of the coloring matter. Also, when the lower layer film has an absorption as shown in FIG. 7(a), the refractive index of the lower layer film has an abnormal dispersion such that the refractive index becomes large in the longer wavelength region than the respective absorption peaks and small in the shorter wavelength region than the respective absorption peaks, as shown in FIG. 7(b), based on an absorbing effect of the coloring matter. Accordingly, a film having high refractive indexes in the visible region of longer wavelength and low refractive indexes in the region of shorter wavelength can be obtained.

A result of simulation indicates that the reflectivity of the above described film, which is composed of two laminated thin films having a low refractive index and a high refractive index, respectively, and containing coloring matter in the upper film and the lower film, respectively, and which operates to suppress reflection by utilizing an interference effect of light, can suppress reflection all over the region of visible wavelength, as shown by the spectral reflection curve 1 in FIG. 1, by the effect of the abnormal dispersion of refractive index in each respective layer. In FIG. 2, the spectral reflection curve 2 relates to a laminated film which contains no coloring matter. In comparing the curves 1 and 2, it is seen that a film having significantly low reflection all over the visible light region can be obtained by mixing coloring matter into the film.

Even if any one of a coloring matter having an absorption peak in the near infrared region of 700–900 nm and coloring matter having an absorption peak in a region of 600–700 nm is selected, a more preferable anti-reflection effect than the film which contains no coloring matter can be obtained. However, when only the coloring matter having on absorption peak in a region of 700–900 nm is employed, a sufficient anti-reflection effect can be realized in the visible light region of less than 600 nm, but a problem is caused in that the reflectivity in the vicinity of the region of 600–700 nm becomes somewhat larger than the case when no coloring matter is contained in the film. Furthermore, when only the coloring matter having an absorption peak in the near infrared region of 700–900 is employed, a problem is caused in that reflection in a region near 560 nm, where the reflection is most desirably suppressed, can not be decreased sufficiently. Therefore, concurrent use of both coloring matter having an absorption peak in the near infrared region of 700–900 nm and coloring matter having an absorption peak in the region of 600–700 nm is most effective and preferable.

For instance, when silicon naphthalocyanine is used as the coloring matter having an absorption peak in the near infrared region of 700–900 nm, copper phthalocyanine is used as the coloring matter having an absorption peak in a region of 600–700 nm, and acid red is used as the coloring matter having an absorption peak in the region of 500–600 nm, and when a $SiO_2$ group film is used as the upper layer and an ITO group film is used as the lower film, an anti-reflection effect all over the visible light region, as shown in the spectral reflection curve 1 in FIG. 1, can actually be obtained.

As to the order of the laminating layers mixed with the coloring matter, there is an optimum order depending on the kind of mixed coloring matter. For instance, when red coloring matter having an absorption peak in a region of 500–600 nm is used in the uppermost layer, the refractive index near 600 nm is increased by an effect of the absorption peak near 560 nm, and as a result, the reflectivity near 600 nm is increased extraordinarily. However, copper phthalocyanine having an absorption peak in a region near 650 nm has an effect to decrease the refractive index to less than 600 nm, and consequently, a film of low reflection can be obtained. As explained above, if the order of placing the layer in which the coloring matter is mixed is not selected adequately, a preferable result can not be obtained.

Light in the vicinity of 560 nm, which is most sensitive to the eye of a human being, is absorbed by the red coloring matter. The red coloring matter also absorbs side bands of a fluorescent body in a display apparatus using the fluorescent body, such as a cathode ray tube, and the like. If a conductive layer is selected as the lower layer film, an anti-static effect can be provided.

In preparation of the laminated film, the upper layer and the lower layer must contain independent coloring matter, respectively. That means, oozing of the coloring matter in the respective layer must be prevented in preparing the laminated film. Therefore, if the uppermost film is prepared by applying a solution which contains a solvent as a main component, in which the coloring matter contained in the next lower layer is not soluble nor dispersible, oozing of the coloring matter in the next lower layer into the uppermost film can be prevented and control of the refractive index can be facilitated. Similarly, if the next lower film is prepared by applying a solution which contains a solvent as a main component, in which the coloring matter contained in the uppermost layer is not soluble nor dispersible, oozing of the coloring matter in the uppermost layer into the next lower film can be prevented and control of the refractive index can be facilitated.

A cathode ray tube having a lower reflection all over the visible light region than conventional cathode ray tubes, as shown by the spectral reflection curve 1 in FIG. 1, can be obtained by forming at least two films on the front plane surface of the face plate of the cathode ray tube, wherein one of the films contains SiO2 as a main component, coloring matter having an absorption in a region near infrared, and blue coloring matter, and the next lower film is conductive and is prepared by applying a solution which contains a solvent as a main component, which does not dissolve nor disperse the coloring matter having an absorption in the region near infrared and the blue coloring matter.

If the next lower layer of the uppermost layer is a film containing $SnO_2$, ZnO, or ITO, the film operates as a high reflection film. These films are conductive, and have an anti-static effect. The conductive film is preferably the next lower layer of the uppermost layer, because the refractive indexes of these conductive films are regarded as relatively larger ones among metal oxide materials. Therefore, when providing a two-layer film on a glass substrate, the refractive index of the lower layer must be larger than the refractive index of the upper layer in order to obtain 1.23 as the ratio of the refractive indexes.

The effect of mixing coloring matter can be realized even in a case when the coloring matter is added into the films in only even number order or only odd number order, respectively. When an anti-reflection film is prepared having a multi-layer structure, wherein at least two thin layers are laminated, at a front surface, and when the film contains coloring matter having an absorption peak in a region of 300–400 nm in the layers of odd number order from the uppermost film, the reflection in the vicinity of 400 nm can be suppressed even if the red coloring matter is not contained in the next lower film layer. Because, if the absorption peak exists in a region of 300–400 nm, the refractive index in a region of wavelength larger than the region of 300–400 nm, i.e. in the vicinity of 400 nm, increases, and accordingly, the difference in the refractive index from the high refractive index of the next lower film layer decreases.

The theory for obtaining the high performance anti-reflection film, as explained above, can be applied to not only a film of two-layer structure, but also to a film of multi-layers structure. However, the coloring matter is desirably mixed into a layer close to the uppermost layer. Because, when incident light into the anti-reflection film reflects at a boundary with the next lower film layer, the reflection at the boundary between the uppermost layer and the next lower layer is the greatest, and the reflection decreases for light entering into successively lower layers. Accordingly, the effect of coloring matter mixing is most significant when the coloring matter is mixed into the uppermost layer and the next lower layer.

DESCRIPTION OF THE PREFERRED EMBODIMENTS

Referring to the following embodiments, the present invention will be explained in detail.
(Embodiment 1)

A solution consisting of $Si(OC_2H_5)_4$, $H_2O$, $HNO_3$, and THF in a ratio by weight of 2:1:0.1:20 was prepared, and silicon naphthalocyanine having an absorption peak in the near infrared region of 700 nm–900 nm and copper phthalocyanine having an absorption peak in a region of 600 nm–700 nm were respectively added to the solution in an amount of 0.18% by weight. Further, acid red having an absorption peak in a region of 500 nm–600 nm was added to ethyl alcohol, wherein ITO fine particles of 20 nm in diameter were dispersed, in an amount of 0.06% by weight.

The acid red solution containing ITO was applied onto the front surface of a cathode ray tube by rotary application at 150 rpm. After the acid red solution was dried, the silicon naphthalocyanine-copper phthalocyanine solution containing $SiO_2$ was applied by rotary application at 150 rpm. The phthalocyanine group and naphthalocyanine group coloring matter can be dispersed well in THF, but hardly in ethyl alcohol. The acid red can be dissolved in ethyl alcohol, but hardly in THF. Therefore, the coloring matter in the respective layers did not ooze out. After the application, the film was treated thermally at 160° C. for 30 minutes.

Figure 6A:
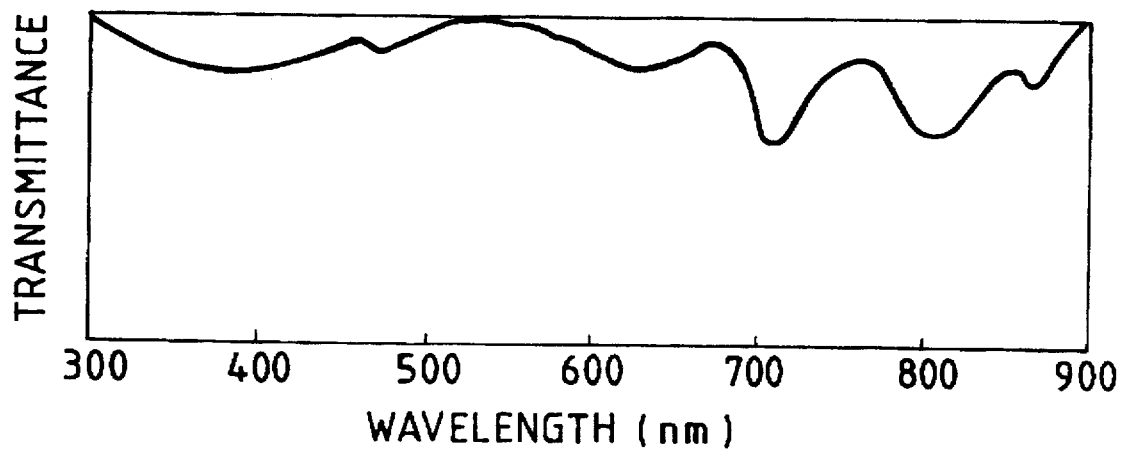
FIG. 6(a) is a graph indicating the transmittance of $SiO_2$ film containing coloring matter having an absorption in a region near infrared and blue coloring matter.
Figure 6B:
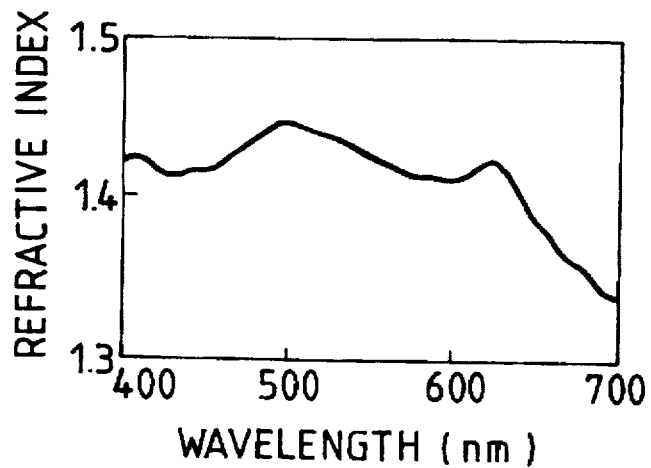
FIG. 6(b) is a graph indicating the refractive index of $SiO_2$ film containing coloring matter having an absorption in a region near infrared and blue coloring matter.
Figure 7A:
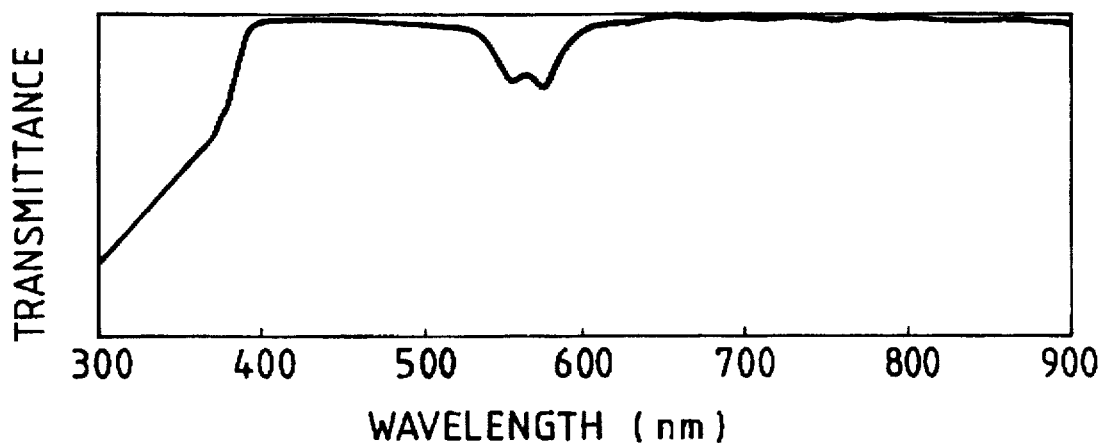
FIG. 7(a) is a graph indicating the transmittance of ITO film containing red coloring matter.
Figure 7B:
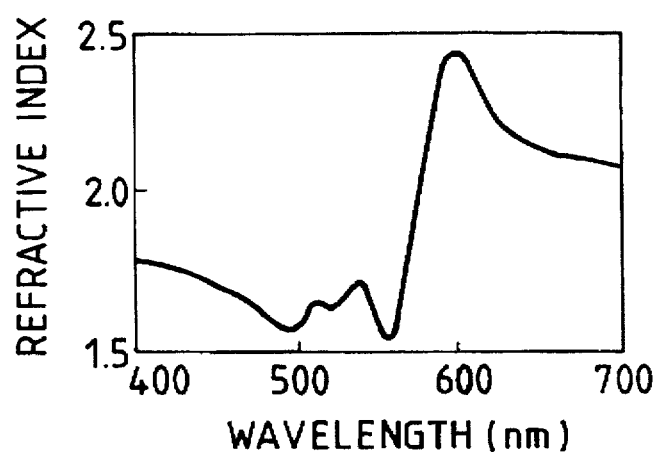
FIG. 7(b) is a graph indicating the refractive index of ITO film containing red coloring matter.
Figure 8:
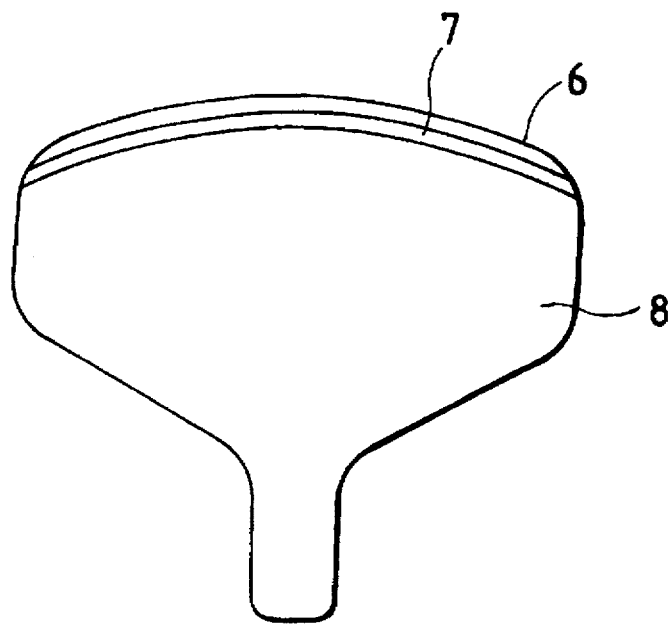
FIG. 8 is a schematic diagram of a cathode ray tube provided with a laminated film, which is composed of a $SiO_2$ film containing coloring matter having an absorption in a region near infrared and blue coloring matter and an ITO film containing red coloring matter, at the front outermost surface.

A schematic diagram of the prepared cathode ray tube is shown in FIG. 8. In FIG. 8, the reference numeral 6 indicates the $SiO_2$ film containing silicon naphthalocyanine-copper phthalocyanine, 7 denotes the ITO film containing acid red, and 8 denotes cathode ray tube envelope. The thickness of the respective films was approximately 100 nm. The transmittance and the reflectivity of the film at the outermost surface of the cathode ray tube are shown in FIGS. 6(a) and 6(b); and, transmittance and the reflectivity of the film at the second outer surface of the cathode ray tube are shown in FIGS. 7(a) and 7(b).

Figure 1:
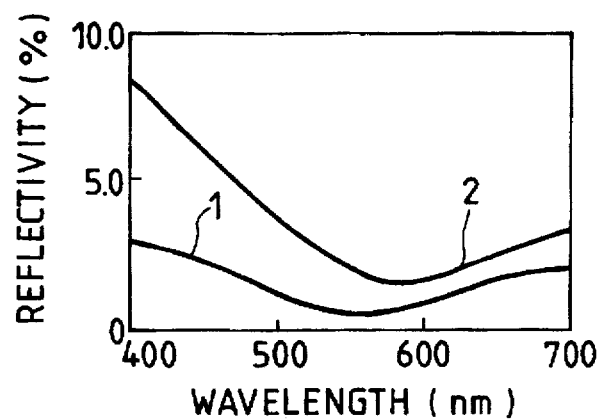
FIG. 1 is a graph indicating the reflectivity in a region of visible light of laminated films composed of a $SiO_2$ film containing coloring matter having an absorption in a region near infrared and blue coloring matter and an ITO film containing red coloring matter.
Figure 2:
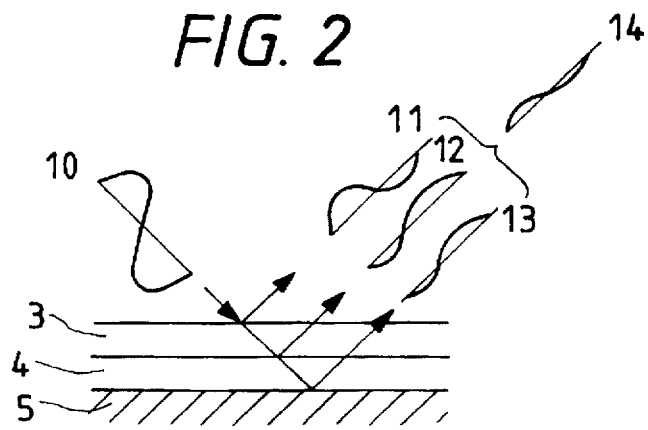
FIG. 2 is a schematic cross sectional view of an anti-reflection film.
Figure 3:
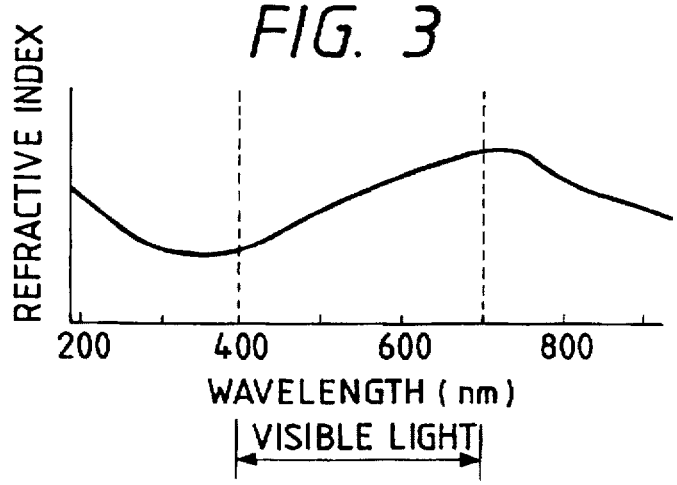
FIG. 3 is a graph indicating the refractive index of a film which satisfies the non-reflecting condition in a wide wavelength region.
Figure 4:
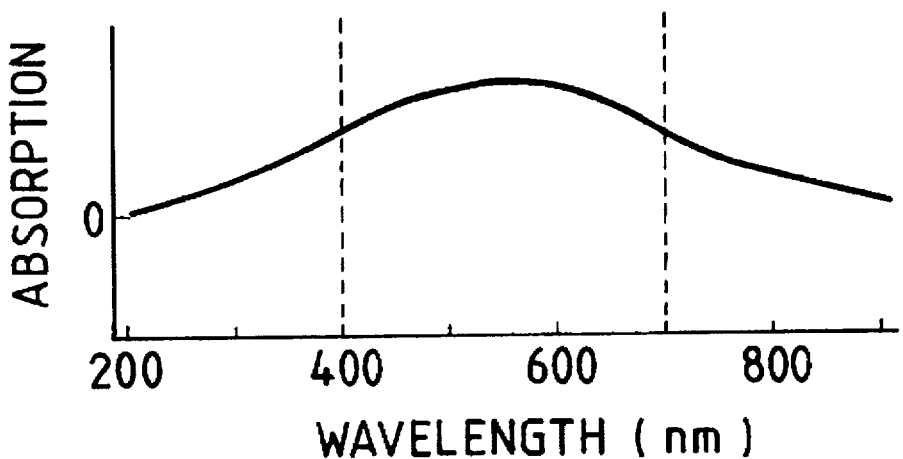
FIG. 4 is a graph indicating the absorption peak for achieving the refractive index dispersion indicated in FIG. 3.
Figure 5:
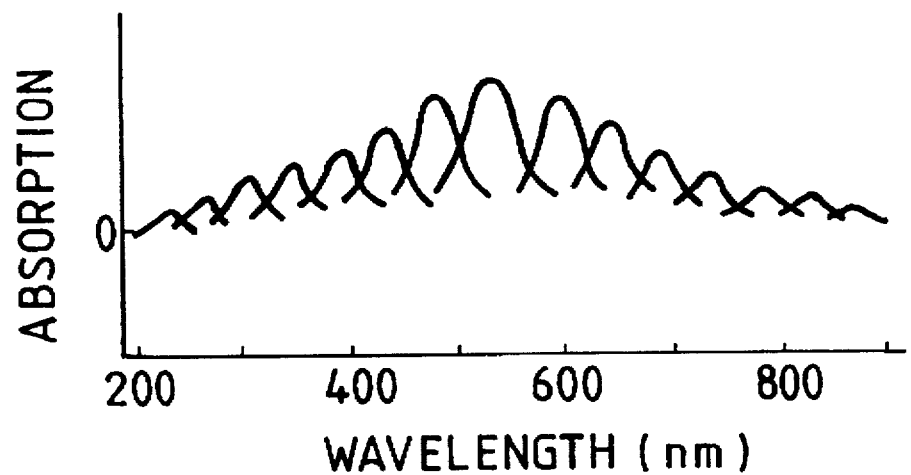
FIG. 5 is a graph for explaining a method for realizing the absorption peak with various kinds of coloring matter.

The spectral reflectivity curve of the cathode ray tube is shown by the curve 1 in FIG. 1. The curve 2 in FIG. 1 is the spectral reflectivity curve of a cathode ray tube which is provided with an anti-reflection film containing no coloring matter. As shown in FIG. 1, the reflectivity of the cathode ray tube of the present embodiment was very small and high resolution was obtained all over the visible light region without a side band near 560 nm, and the extremely V-shaped reflection curve which had been a problem to be solved when the coloring matter was not used in the respective layers did not appear, although the reflection of the lower layer was sufficiently small. Furthermore, the cathode ray tube had a low surface resistivity of approximately $10^5$ $\Omega/\square$, because of the conductivity of the ITO fine particles, and also an anti-static effect.

Figure 9:
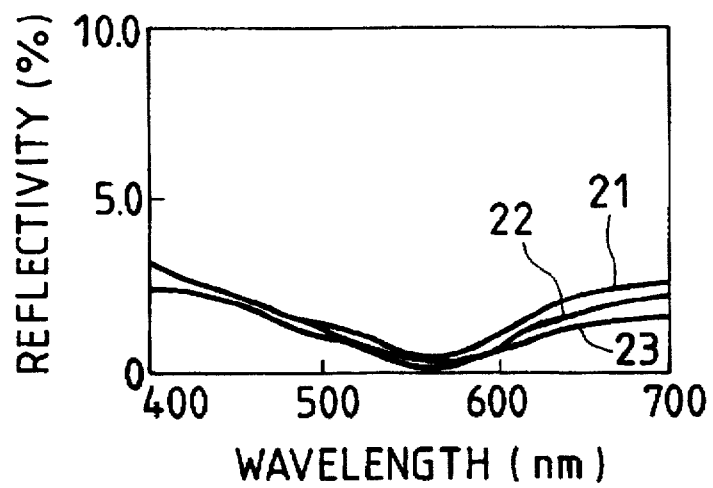
FIG. 9 is a graph indicating the reflectivity of anti-reflection films containing various kinds of coloring matter.

Another anti-reflection film was prepared in the same manner as the above film, except for replacing the copper phthalocyanine with methylene green or brilliant crezyl blue, replacing the acid red with alizarine red, crystal violet, or quinacuridone, and replacing the silicon naphthalocyanine with anthraquinone, or polymethyne. The concentration of the respective coloring matter was 0.06% by weight, and the film thickness was approximately 100 nm. The reflection spectra of various anti-reflection films prepared in the above manner are shown in FIG. 9. In FIG. 9, the curve 21 indicates the reflection curve of a laminated film composed of a lower layer of alizarine red and an upper layer of a mixture of methylene green and anthraquinone, the curve 22 indicates the reflection curve of a laminated film composed of a lower layer of crystal violet and an upper layer of a mixture of brilliant crezyl blue and polymethyne, and the curve 23 indicates the reflection curve of a laminated film composed of a lower layer of quinacuridone and an upper layer of a mixture of methylene green and polymethyne. As FIG. 9 shows, if the coloring matter have approximately the same absorption peak position, films having similar preferable reflection characteristics can be obtained even if different coloring matter is used.

(Embodiment 2)

A solution consisting of $Si(OC_2H_5)_4$, $H_2O$, $HNO_3$, and THF in a ratio by weight of 2:1:0.1:20 was prepared, and copper phthalocyanine having an absorption peak in a region of 600 nm–700 nm was added to the solution in an amount of 0.18% by weight. Further, acid red having an absorption peak in a region of 500 nm–600 nm was added to ethyl alcohol, wherein ITO fine particles of 20 nm in diameter were dispersed, in an amount of 0.06% by weight.

The acid red solution containing ITO was applied onto the front surface of a cathode ray tube by rotary application at 150 rpm. After the acid red solution was dried, the copper phthalocyanine solution containing $SiO_2$ was applied by rotary application at 150 rpm. The phthalocyanine group coloring matter can be dispersed well in THF, but hardly in ethyl alcohol. The acid red can be dissolved in ethyl alcohol, but hardly in THF. Therefore, the coloring matter in the respective layers did not ooze out. After the application, the film was treated thermally at 160° C. for 30 minutes. The thickness of the respective layers was approximately 100 nm.

Figure 10A:
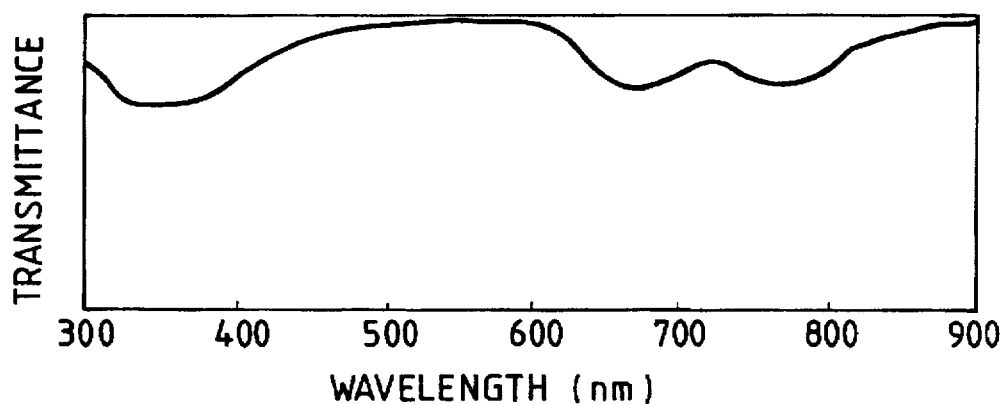
FIG. 10(a) is a graph indicating the transmittance of $SiO_2$ film containing copper phthalocyanine.
Figure 10B:
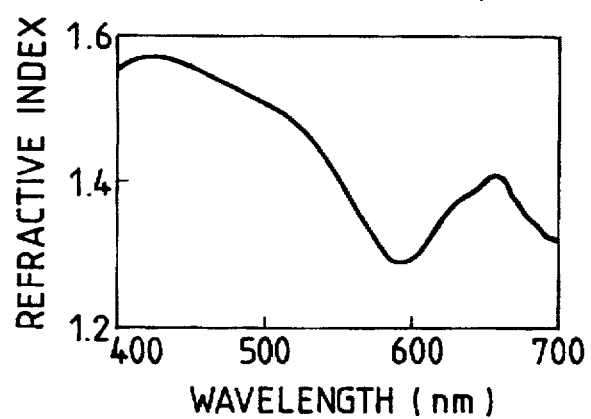
FIG. 10(b) is a graph indicating the refractive index of $SiO_2$ film containing copper phthalocyanine.
Figure 11:
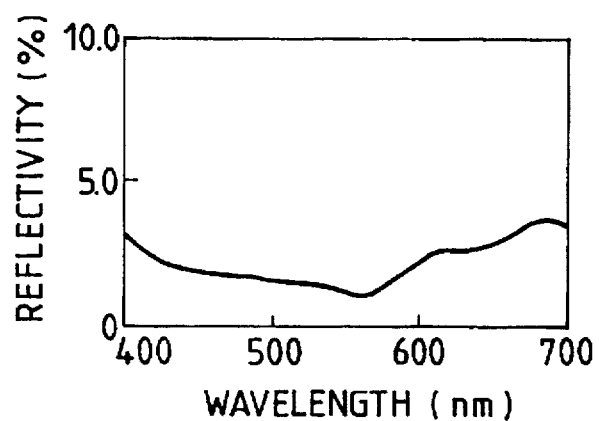
FIG. 11 is a graph indicating the reflectivity of a cathode ray tube provided with a laminated film composed of a $SiO_2$ film containing copper phthalocyanine and an ITO film containing acid red at the front outermost surface.

The transmittance and the reflectivity of the film at the outermost surface of the cathode ray tube are shown in FIGS. 10(a) and 10(b). As shown in FIG. 11, the reflectivity of the cathode ray tube of the present embodiment was very small and high resolution was obtained in a region less than 600 nm without a side band near 560 nm. The cathode ray tube had a low surface resistivity of approximately $10^5$ $\Omega/\square$, because of the conductivity of the ITO fine particles have conductivity, and also an anti-static effect.

(Embodiment 3)

A solution consisting of $Si(OC_2H_5)_4$, $H_2O$, $HNO_3$, and THF in a ratio by weight of 2:1:0.1:20 was prepared, and silicon naphthalocyanine having an absorption peak in a region of 700 nm–900 nm was added to the solution in an amount of 0.18% by weight. Further, rhodamine B having an absorption peak in a region of 500 nm–600 nm was added to ethyl alcohol, wherein ITO fine particles of 20 nm in diameter were dispersed, in an amount of 0.06% by weight.

The rhodamine B solution containing ITO was applied onto the front surface of a cathode ray tube by rotary application at 150 rpm. After the rhodamine B solution was dried, the silicon naphthalocyanine solution containing $SiO_2$ was applied by rotary application at 150 rpm. The naphthalocyanine group coloring matter can be dispersed well in THF, but hardly in ethyl alcohol. The rhodamine group coloring matter can be dissolved in ethyl alcohol, but hardly in THF. Therefore, the coloring matter in the respective layers did not ooze out. After the application, the film was treated thermally at 160° C. for 30 minutes. The thickness of the respective layers was approximately 100 nm.

Figure 12A:
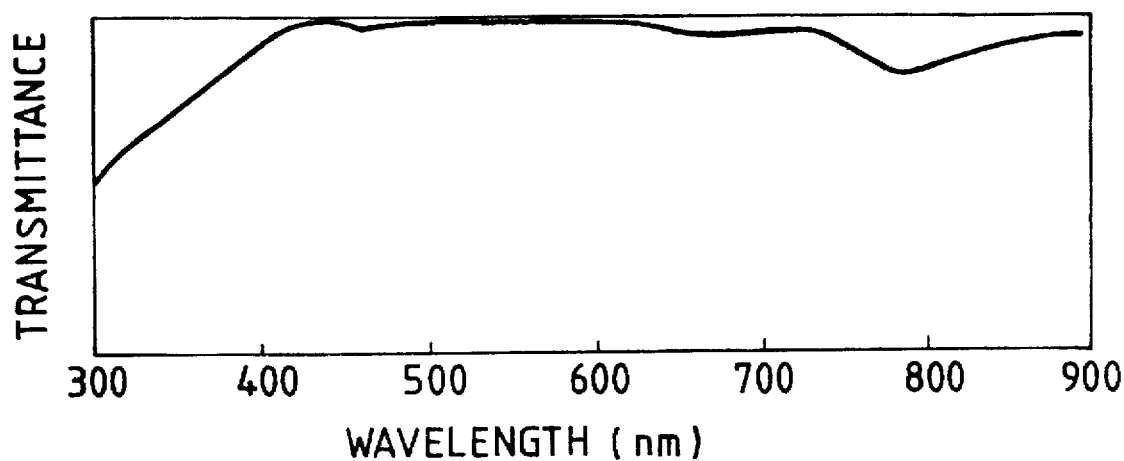
FIG. 12(a) is a graph indicating the transmittance of $SiO_2$ film containing silicon naphthalocyanine.
Figure 12B:
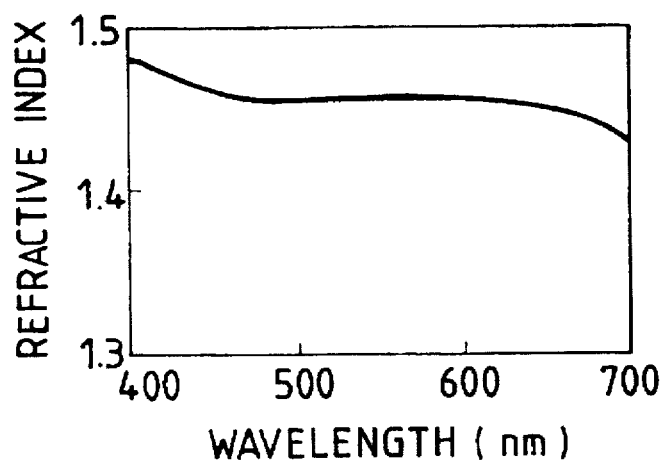
FIG. 12(b) is a graph indicating the refractive index of $SiO_2$ film containing silicon naphthalocyanine.
Figure 13:
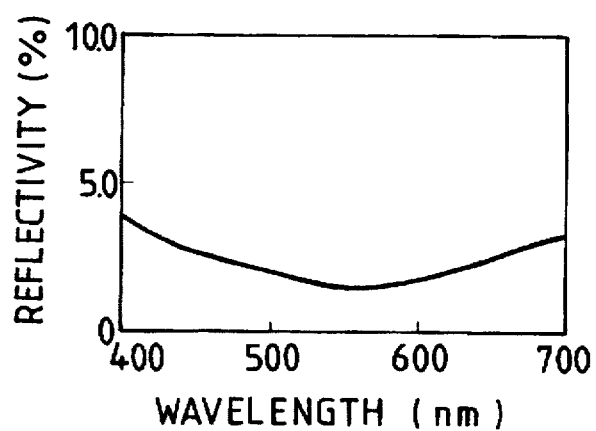
FIG. 13 is a graph indicating the reflectivity of a cathode ray tube provided with a laminated film composed of a $SiO_2$ film containing silicon naphthalocyanine and an ITO film containing rhodamine at the front outermost surface.

The transmittance and the reflectivity of the film at the outermost surface of the cathode ray tube are shown in FIGS. 12(a) and 12(b). The transmittance and the reflectivity of the second layer were the same as FIGS. 7(a) and (b). As shown in FIG. 13, the reflectivity of the cathode ray tube of the present embodiment was very small and high resolution was obtained all over the visible light region without a side band near 560 nm. The cathode ray tube had a low surface resistivity of approximately $10^5$ $\Omega/\square$, because of the conductivity of the ITO fine particles, and also an anti-static effect.

(Embodiment 4)

A solution consisting of $Si(OC_2H_5)_4$, $H_2O$, $HNO_3$, and THF in a ratio by weight of 2:1:0.1:20 was prepared, and silicon naphthalocyanine having an absorption peak in a region of 700 nm–900 nm and copper phthalocyanine having an absorption peak in a region of 600 nm–700 nm were added to the solution in an amount of 0.18% by weight, respectively. Further, a solution consisting of $Ti(OC_3H_7)_4$, $H_2O$, $HNO_3$, and EtOH in a ratio by weight of 3:1:0.1:20 was prepared.

The TiO$_2$ solution was applied onto the front surface of a cathode ray tube by rotary application at 150 rpm. After the TiO$_2$ solution was dried, the solution of silicon naphthalocyanine and copper phthalocyanine containing SiO$_2$ was applied by rotary application at 150 rpm. In this operation, because the phthalocyanine group and naphthalocyanine group coloring matter can be dispersed well in THF, but hardly in ethyl alcohol, oozing out of the coloring matter into the lower layer did not occur. After the application, the film was treated thermally at 160° C. for 30 minutes. The thickness of the respective layers was approximately 100 nm.

Figure 14:
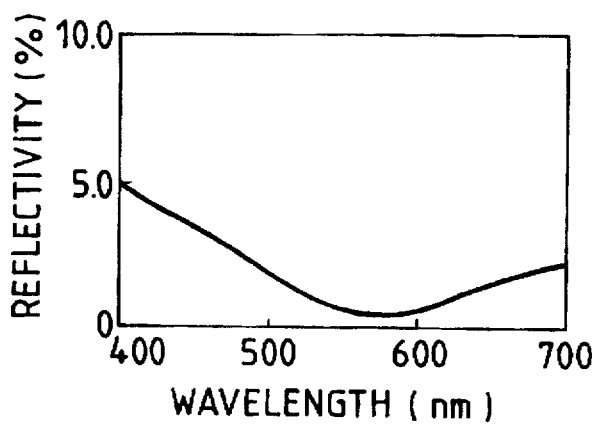
FIG. 14 is a graph indicating the reflectivity of a cathode ray tube provided with a laminated film composed of a $SiO_2$ film containing silicon naphthalocyanine and copper phthalocyanine, and a $TiO_2$ film at the front outermost surface.

As shown in FIG. 14, the reflection of the cathode ray tube of the present embodiment was very small and high resolution was obtained all over the visible light region.

(Embodiment 5)

A solution consisting of Si(OC$_2$H$_5$)$_4$, H$_2$O, HNO$_3$, and THF in a ratio by weight of 2:1:0.1:20 was prepared, and silicon naphthalocyanine having an absorption peak in a region of 700 nm–900 nm and copper phthalocyanine having an absorption peak in a region of 600 nm–700 nm were added to the solution in an amount of 0.18% by weight, respectively. Further, acid red having an absorption peak in a region of 500 nm–600 nm was added to ethyl alcohol, wherein SnO$_2$ fine particles of 20 nm in diameter were dispersed, in an amount of 0.06% by weight.

The acid red solution containing SnO$_2$ was applied onto the front surface of a cathode ray tube by rotary application at 150 rpm. After the acid red solution was dried, the solution of silicon naphthalocyanine and copper phthalocyanine containing SiO$_2$ was applied by rotary application at 150 rpm. In this operation, the phthalocyanine group and the naphthalocyanine group coloring matter can be dispersed well in THF, but hardly in ethyl alcohol. The acid red can be dissolved in ethyl alcohol, but hardly in THF. Therefore, the coloring matter in the respective layers did not ooze out. After the application, the film was treated thermally at 160° C. for 30 minutes. The thickness of the respective layers was approximately 100 nm.

Figure 15:
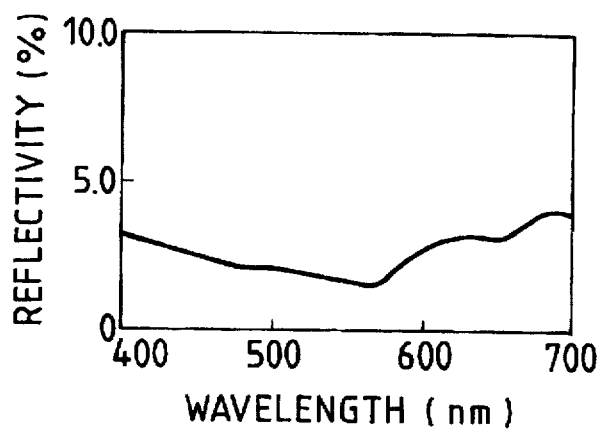
FIG. 15 is a graph indicating the reflectivity of a cathode ray tube provided with a laminated film composed of a $SiO_2$ film containing silicon naphthalocyanine and copper phthalocyanine, and a $SnO_2$ film containing acid red at the front outermost surface.

As shown in FIG. 15, the reflection of the cathode ray tube of the present embodiment was very small and high resolution was obtained all over the visible light region without a side band near 560 nm. The cathode ray tube had a low surface resistivity of approximately $10^5$ Ω/□, because of the conductivity of the SnO$_2$ fine particles, and also an anti-static effect.

(Embodiment 6)

A solution consisting of Si(OC$_2$H$_5$)$_4$, H$_2$O, HNO$_3$, and THF in a ratio by weight of 2:1:0.1:20 was prepared, and silicon naphthalocyanine having an absorption peak in a region of 700 nm–900 nm and copper phthalocyanine having an absorption peak in a region of 600 nm–700 nm were added to the solution in an amount of 0.18% by weight, respectively.

Further, a solution consisting of Ti(OC$_3$H$_7$)$_4$, H$_2$O, HNO$_3$, and EtOH in a ratio by weight of 3:1:0.1:20 was prepared, and acid red having an absorption peak in a region of 500 nm–600 nm was added to the solution in the amount of 0.06% by weight.

The acid red solution containing TiO$_2$ was applied onto the front surface of a cathode ray tube by rotary application at 150 rpm. After the acid red solution was dried, the solution of silicon naphthalocyanine and copper phthalocyanine containing SiO$_2$ was applied by rotary application at 150 rpm. After the application, the film was treated thermally at 160° C. for 30 minutes. The thickness of the respective layers was approximately 100 nm.

Figure 16:
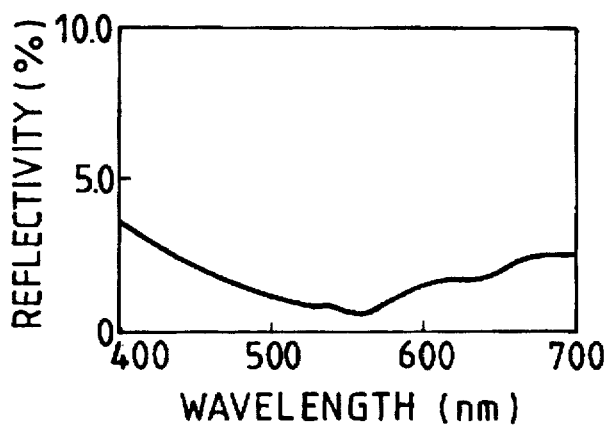
FIG. 16 is a graph indicating the reflectivity of a cathode ray tube provided with a laminated film composed of a $SiO_2$ film containing silicon naphthalocyanine and copper phthalocyanine, and a $TiO_2$ film containing acid red at the front outermost surface.

As shown in FIG. 16, the reflectivity of the cathode ray tube of the present embodiment was very small and high resolution was obtained all over the visible light region without a side band near 560 nm.

(Embodiment 7)

A solution consisting of Si(OC$_2$H$_5$)$_4$, H$_2$O, HNO$_3$, and THF in a ratio by weight of 2:1:0.1:20 was prepared, and silicon naphthalocyanine having an absorption peak in a region of 700 nm–900 nm and copper phthalocyanine having an absorption peak in a region of 600 nm–700 nm were added to the solution in an amount of 0.18% by weight, respectively. Further, a solution consisting of Zn(OC$_2$H$_5$)$_2$, H$_2$O, HNO$_3$, and EtOH in a ratio by weight of 1.5:1:0.1:20 was prepared, and acid red having an absorption peak in a region of 500 nm–600 nm was added to the solution in an amount of 0.06% by weight. The acid red solution containing ZnO was applied onto the front surface of a cathode ray tube by rotary application at 150 rpm. After the acid red solution was dried, the solution of silicon naphthalocyanine and copper phthalocyanine containing SiO$_2$ was applied by rotary application at 150 rpm. After the application, the film was treated thermally at 160° C. for 30 minutes. The thickness of the respective layers was approximately 100 nm.

Figure 17:
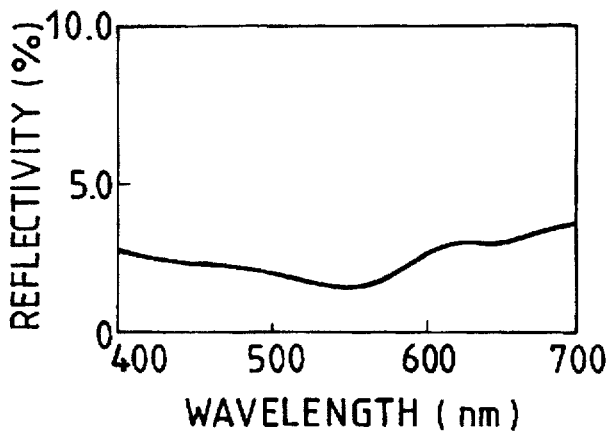
FIG. 17 is a graph indicating the reflectivity of a cathode ray tube provided with a laminated film composed of a $SiO_2$ film containing silicon naphthalocyanine and copper phthalocyanine, and a $ZnO$ film containing acid red at the front outermost surface

As shown in FIG. 17, the reflectivity of the cathode ray tube of the present embodiment was very small and high resolution was obtained all over the visible light region without a side band near 560 nm. The cathode ray tube had a low surface resistivity of approximately $10^7$ Ω/□, because of the conductivity of the ZnO, and also an anti-static effect.

(Embodiment 8)

A solution consisting of Si(OC$_2$H$_5$)$_4$, H$_2$O, HNO$_3$, and THF in a ratio by weight of 2:1:0.1:20 was prepared, and copper phthalocyanine having an absorption peak in a region of 300 nm–400 nm was added to the solution in an amount of 0.18% by weight. Further, an ethyl alcohol solution, wherein ITO fine particles of 20 nm in diameter were dispersed, was applied onto the front surface of a cathode ray tube by rotary application at 150 rpm. After the ITO dispersed solution was dried, the copper phthalocyanine solution containing SiO$_2$ was applied by rotary application at 150 rpm. After the application, the film was treated thermally at 160° C. for 30 minutes. The thickness of the respective layers was approximately 100 nm.

Figure 18:
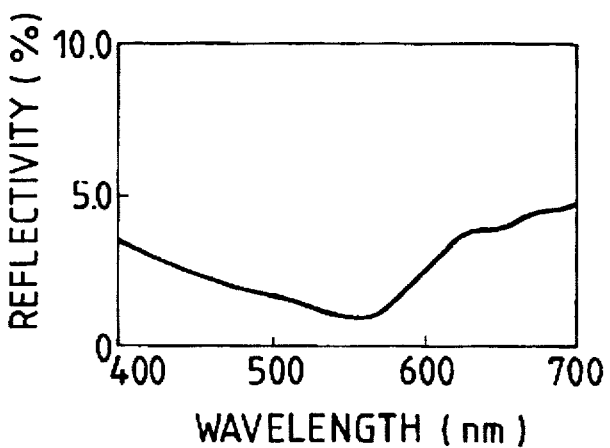
FIG. 18 is a graph indicating the reflectivity of a cathode ray tube provided with a laminated film composed of a $SiO_2$ film containing copper phthalocyanine, and an ITO film at the front outermost surface.

The cathode ray tube had an anti-static effect, because of the conductivity of the ITO fine particles and surface resistivity was as low as approximately $10^4$ Ω/□. In spite of a large difference between the base refractive index of the upper film and of the lower film when the coloring matter was not mixed, a peak of reflection near 400 nm, which caused a problem when the coloring matter was not mixed into the anti-reflection film, did not appear, and cathode ray tube was obtained in which the reflectivity was very small and high resolution was provided all over the visible light region, as shown in FIG. 18.

Even if benzophenone group coloring matter, i.e. an ultraviolet absorbing agent, was used instead of copper phthalocyanine, a film having reflection characteristics without a peak near 400 nm could be obtained.

(Embodiment 9)

A solution consisting of Si(OC$_2$H$_5$)$_4$, H$_2$O, HNO$_3$, and THF in a ratio by weight of 2:1:0.1:20 was prepared, and copper phthalocyanine and silicon naphthalocyanine having an absorption peak in a region of 200 nm–400 nm were added to the solution in an amount of 0.18% by weight, respectively. An ethyl alcohol solution, wherein ITO fine particles of 20 nm in diameter were dispersed, was applied onto the front surface of a cathode ray tube by rotary application at 150 rpm. After the ITO dispersed solution was dried, the copper phthalocyanine and silicon phthalocyanine solution containing $SiO_2$ was applied by rotary application at 150 rpm. After the application, the film was treated thermally at 160° C. for 30 minutes. The thickness of the respective layers was approximately 100 nm.

Figure 19:
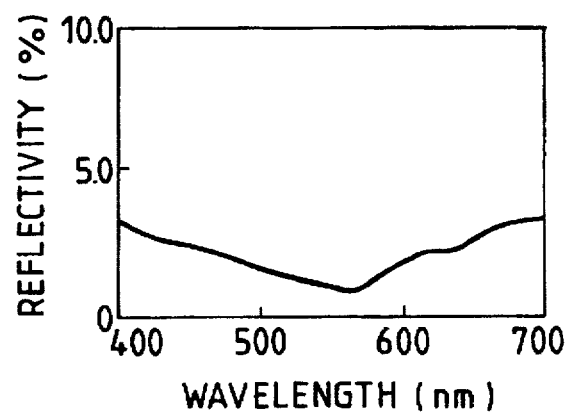
FIG. 19 is a graph indicating the reflectivity of a cathode ray tube provided with a laminated film composed of a $SiO_2$ film containing silicon naphthalocyanine and copper phthalocyanine, and an ITO film at the front outermost surface.

The cathode ray tube had an anti-static effect, because of the conductivity of the ITO fine particles, and the surface resistivity was as low as approximately $10^4$ Ω/□. In spite of a large difference between the base refractive index of the upper film and of the lower film when the coloring matter was not mixed because of the large refractive index of the base film, a peak of reflection near 400 nm, which caused a problem when the coloring matter was not mixed into the anti-reflection film, did not appear, and a cathode ray tube was obtained in which the reflectivity was very small and high resolution was provided all over the visible light region, as shown in FIG. 19.

(Embodiment 10)

A solution consisting of $Si(OC_2H_5)_4$, $H_2O$, $HNO_3$, and THF in a ratio by weight of 2:1:0.1:20 was prepared, and silicon naphthalocyanine having an absorption peak in a region near infrared of 700 nm–900 nm and copper phthalocyanine having an absorption peak in a region of 600 nm–700 nm were added to the solution in an amount of 0.18% by weight, respectively.

Further, acid red having an absorption peak in a region of 500 nm–600 nm was added to ethyl alcohol, wherein ITO fine particles of 20 nm in diameter were dispersed, in an amount of 0.06% by weight. A solution consisting of $Ti(OC_3H_7)_4$, $H_2O$, $HNO_3$, and EtOH in a ratio by weight of 3:1:0.1:20 was prepared.

After the $Ti(OC_3H_7)_4$ sol solution was applied onto the front surface of a cathode ray tube by rotary application at 150 rpm and dried, acid red solution containing ITO was applied by rotary application at 150 rpm. After the acid red solution was dried, the solution of silicon naphthalocyanine and copper phthalocyanine containing $SiO_2$ was applied by rotary application at 150 rpm. In this operation, phthalocyanine and naphthalocyanine group coloring matter are dispersed well into THF, but hardly into ethyl alcohol, and acid red can be dissolved into ethyl alcohol, but hardly into THF. Therefore, the coloring matter in the respective layers did not ooze out. After forming a film of the three layers as explained above, the film was treated thermally at 160° C. for 30 minutes. The thickness of the respective layers was approximately 100 nm.

Figure 20:
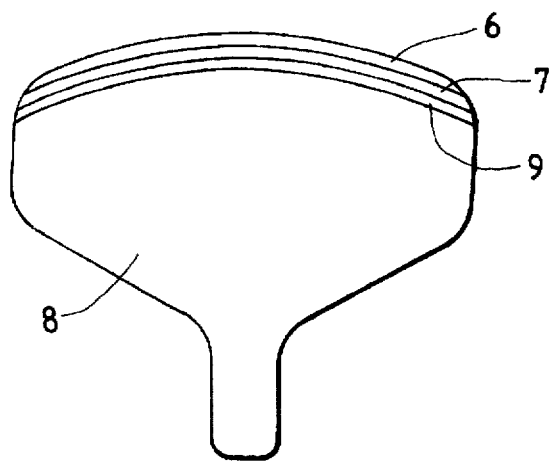
FIG. 20 is a schematic perspective view of a cathode ray tube provided with a laminated film, which is composed of a $SiO_2$ film containing coloring matter having an absorption in a region near infrared and blue coloring matter, an ITO film containing red coloring matter, and $TiO_2$ film at the front outermost surface.
Figure 21:
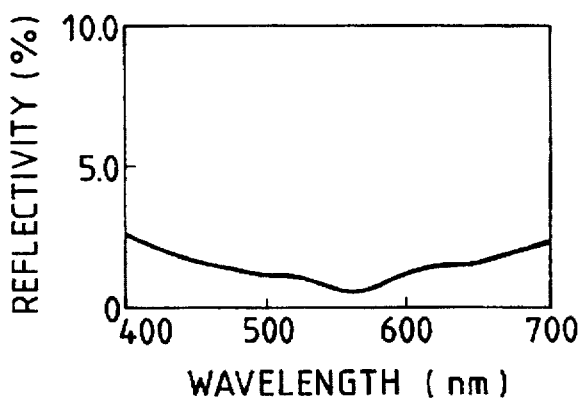
FIG. 21 is a graph indicating the reflectivity of a cathode ray tube provided with a laminated film, which is composed of a $SiO_2$ film containing coloring matter having an absorption in a region near infrared and blue coloring matter, an ITO film containing red coloring matter, and $TiO_2$ film at the front outermost surface.

A schematic diagram of the manufactured cathode ray tube is shown in FIG. 20. In FIG. 20, the reference numeral 9 indicates a $TiO_2$ film, 6 denotes a $SiO_2$ film containing silicon naphthalocyanine and copper phthalocyanine, 7 indicates an ITO film containing acid red, and 8 denotes a cathode ray tube envelope. The thickness of the respective film layers is approximately 100 nm. The reflectivity of the cathode ray tube of the present embodiment was very small and high resolution was obtained all over the visible light region without a side band near 560 nm, as shown in FIG. 21. The cathode ray tube had a low surface resistivity of approximately $10^5$ Ω/□ and an anti-static effect, because of the conductivity of the ITO fine particles. In accordance with the present invention, an anti-reflective film having small reflectivity all over the visible light region widely can be obtained by utilizing a variation of the reflectivity based on abnormal dispersion of the refractive index of a film containing coloring matter, and a highly resolutive display apparatus having a preferable anti-reflective effect and anti-static effect can be manufactured.

What is claimed is:

1. Anti-reflection film having a multi-layer structure including at least two layers, the at least two layers including an uppermost layer and a layer next to the uppermost layer, wherein each of the uppermost layer and the layer next to the uppermost layer is colored with coloring matter, wherein the coloring matter of the uppermost layer and the coloring matter of the layer next to the uppermost layer have different optical absorbing peaks, and wherein the uppermost layer and the layer next to the uppermost layer have a refractive index dispersion such that the refractive index of the uppermost layer is smaller than the refractive index of the layer next to the uppermost layer.

2. Anti-reflection film as claimed in claim 1, wherein the uppermost layer contains at least one of a material having an absorbing peak in a region near an infrared region of 700 nm–900 nm and a material having an absorbing peak in a region of 600 nm–700 nm.

3. Anti-reflection film as claimed in claim 1, wherein the layer next to the uppermost layer contains a material having an absorbing peak in a region of 500 nm–600 nm.

4. Anti-reflection film as claimed in claim 1, wherein the layer next to the uppermost layer has an electrical conductivity.

5. Anti-reflection film as claimed in claim 1, wherein the layer next to the uppermost layer has an electrical conductivity and contains a material having an absorbing peak in a region of 500 nm–600 nm.

6. Anti-reflection film as claimed in claim 1, wherein the uppermost layer contains at least one of a material having an absorbing peak in a region near an infrared region of 700 nm–900 nm, and a material having an absorbing peak in a region of 600 nm–700 nm, and the layer next to the uppermost layer has an electrical conductivity.

7. Anti-reflection film as claimed in claim 1, wherein the uppermost layer contains at least one of a material having an absorbing peak in a region near an infrared region of 700 nm–900 nm and a material having an absorbing peak in a region of 600 nm–700 nm, and the layer next to the uppermost layer contains a material having an absorbing peak in a region of 500 nm–600 nm.

8. Anti-reflection film as claimed in claim 1, wherein the uppermost layer contains at least one of a material having an absorbing peak in a region near an infrared region of 700 nm–900 nm and a material having an absorbing peak in a region of 600 nm–700 nm, and the layer next to the uppermost layer contains a material having an absorbing peak in a region of 500 nm–600 nm, and is electrically conductive.

9. An anti-reflection film as claimed in claim 1, wherein the uppermost layer is formed by use of a solution which comprises a solvent as a main component, which solvent in the uppermost layer does not dissolve nor disperse well the coloring matter which is contained in the layer next to the uppermost layer.

10. An anti-reflection film as claimed in claim 1, wherein the layer next to the uppermost layer is formed by use of a solution which comprises a solvent as a main component, which solvent in said next layer does not dissolve nor disperse well the coloring matter which is contained in the uppermost layer.

11. Anti-reflection film as claimed in any one of claims 2, 6, 7, and 8, wherein
said material, having an absorbing peak in a region near an infrared region of 700 nm–900 nm, contained in the uppermost layer is a coloring matter selected from a group consisting of naphthalocyanine group coloring matter, anthraquinone group coloring matter, and polymethyne group coloring matter.

12. Anti-reflection film as claimed in any one of claims 2, 6, 7, and 8, wherein said material, having an absorbing peak in a region of 600 nm–700 nm, contained in the uppermost layer is a coloring matter selected from a group consisting of phthalocyanine group coloring matter, phenoxazine group coloring matter, and brilliant crezyl blue group coloring matter.

13. Anti-reflection film as claimed in any one of claims 3, 5, 7, and 8, wherein said material, having an absorbing peak in a region of 500 nm–600 nm, contained in the layer next to the uppermost layer is a coloring matter selected from a group consisting of azo coloring matter, xanthene group coloring matter, anthraquinone group coloring matter, triphenylmethane group coloring matter, and quinacridone group coloring matter.

14. Anti-reflection film as claimed in any one of claims 4, 5, 6, and 8, wherein the layer next to the uppermost layer comprises $SnO_2$.

15. Anti-reflection film as claimed in any one of claims 4, 5, 6, and 8, wherein the layer next to the uppermost layer comprises ITO.

16. Anti-reflection film as claimed in any one of claims 4, 5, 6, and 8, wherein the layer next to the uppermost layer comprises ZnO.

17. Anti-reflection film having a multi-layer structure including at least two layers, wherein N-th films (N: odd whole number) from an uppermost layer of the at least two layers contain a material having an absorbing peak in a range of 300 nm–400 nm.

18. Anti-reflection film as claimed in claim 17, wherein said material having an absorbing peak in a range of 300 nm–400 nm is any one of a phthalocyanine group coloring matter and a benzophenone group coloring matter.

19. Anti-reflection film having a multi-layer structure including two layers, wherein said two layers have a refractive index dispersion such that the difference in refractive indexes of said two layers is large in a region of longer wavelength than the middle wavelength of a wavelength region in which a reflection must be prevented, and the difference in refractive indexes of said two layers is small in a region of shorter wavelength than said middle wavelength.

20. Anti-reflection film having a multi-layer structure including two layers, wherein said two layers have a refractive index dispersion such that the refractive indexes of said two layers is large in a region of longer wavelength than the middle wavelength of a wavelength region in which a reflection must be prevented, and the refractive indexes of said two layers is small in a region of shorter wavelength than said middle wavelength.

21. Anti-reflection film having a multi-layer structure including two layers, wherein said two layers have a refractive index dispersion such that a length of optical path at every wavelength is approximately ¼ of the wavelength in the wavelength region in which reflection must be prevented, and a ratio of refractive indexes at every wavelength is approximately a constant value.

22. Anti-reflection film as claimed in any one of claims 19–21, wherein said refractive index dispersion of said two layers is realized by using in said two layers coloring matter having an absorbing peak in a region of predetermined wavelength.

23. A display apparatus provided on a display surface thereof with said anti-reflection film, as claimed in any one of claims 1, 2–10 and 17–21.

24. Anti-reflection film as claimed in claim 1, wherein the refractive index dispersion of the uppermost layer and the layer next to the uppermost layer is such that a difference in refractive index is larger in a longer wavelength region than at a central wavelength of a wavelength region where reflection is to be avoided, and is small in a shorter wavelength region.

25. Anti-reflection film as claimed in claim 1, wherein the refractive index dispersion of the uppermost layer and the layer next to the uppermost layer is such that the refractive index is high in a longer wavelength region than at a central wavelength of a wavelength region where reflection is to be avoided, and is low in a shorter wavelength region.

26. Anti-reflection film as claimed in claim 19, wherein each of said two layers is colored with coloring matter, and wherein the coloring matter of one of the two layers and the coloring matter of the other of the two layers have different optical absorbing peaks.

27. Anti-reflection film as claimed in claim 20, wherein each of said two layers is colored with coloring matter, and wherein the coloring matter of one of the two layers and the coloring matter of the other of the two layers have different optical absorbing peaks.

28. Anti-reflection film as claimed in claim 21, wherein each of said two layers is colored with coloring matter, and wherein the coloring matter of one of the two layers and the coloring matter of the other of the two layers have different optical absorbing peaks.

29. Anti-reflection film as claimed in claim 17, wherein said at least two layers include at least two layers that are colored with coloring matter, and wherein the coloring matter of one of the at least two layers that are colored and the coloring matter of another of the at least two layers that are colored have different optical absorbing peaks.

* * * * *